United States Patent [19]

Thomas

[11] 4,400,315

[45] Aug. 23, 1983

[54] METHOD OF REMOVING PHOSPHATE MATERIALS FROM DEPROTEINIZED CHEESE WHEY

[76] Inventor: Frank A. Thomas, 309 Reese St., Greenwood, Wis. 54437

[21] Appl. No.: 459,937

[22] Filed: Jan. 21, 1983

[51] Int. Cl.$^3$ .......................... A23C 21/00; A23J 3/00
[52] U.S. Cl. ................................ 260/112 R; 210/702; 210/723; 210/737; 210/761; 210/724; 210/758; 426/656; 426/657
[58] Field of Search ................... 260/112 R; 210/723, 210/737, 702, 761, 724, 758

[56] References Cited

U.S. PATENT DOCUMENTS

| | | | |
|---|---|---|---|
| 3,440,165 | 4/1969 | Davis et al. ..................... | 210/758 X |
| 3,716,484 | 2/1973 | Lincoln et al. ................. | 210/724 X |
| 4,001,198 | 1/1977 | Thomas ........................... | 260/112 R |
| 4,043,990 | 8/1977 | Melachouris ..................... | 260/112 |

*Primary Examiner*—Howard E. Schain

[57] ABSTRACT

A method is disclosed for removing phosphates from deproteinized cheese whey to improve the handling characteristics of such deproteinized whey. The method includes adjusting the pH of the deproteinized whey, a heating step subsequent to pH adjustment followed by injection of calcium hydroxide to remove dicalcium phosphate as a precipitate. Following a holding period, the precipitate is removed to yield an improved deproteinized whey.

5 Claims, No Drawings

METHOD OF REMOVING PHOSPHATE MATERIALS FROM DEPROTEINIZED CHEESE WHEY

BACKGROUND OF THE INVENTION

1. Field of the Invention

The present invention relates generally to the field of recovering nutrients from cheese whey and more particularly to a method of improving the handling characteristics of deproteinized cheese whey.

2. Description of the Prior Art

It is known in the art that it is beneficial to recover valuable nutrients from cheese whey. Many billions of pounds of whey are produced each year as a byproduct of the cheese industry and it has been found desirable to recover nutrients from this material to derive economic benefits therefrom and to avoid having to dispose of whey which is so high in BOD and COD loadings. The economic benefits result from the use of the nutrients in place of other dairy or meat products, and the disposal benefits have aided in the control of cheese plant pollution of our streams and rivers.

The simplest way of recovering such nutrients is to merely dry the whey and use the product as an animal feed. More sophisticated techniques, however, have been developed in attempts to recover the highly desirable protein and lactose fractions of the whey. The proteins may be used in milk replacers, as high protein feed supplements and as food enhances, while the lactose material is very suitable for use by the bakery industry and has considerable food and energy value.

The earliest attempts at separating components of whey involved chemical treatments such as pH adjustment, heating, flocuation, etc. and resulted in low quantities of highly denatured products. Electrodialysis has also been attempted to remove salts, but this process is slow and expensive.

More recently, the techniques of ultrafiltration and reverse osmosis have been adapted for treatment of cheese whey. In reverse osmosis, a semipermable membrane is flanked by a concentrated solution and a dilute solution. Natural forces would cause liquid to flow through the membrane to equalize the solute concentration, but in reverse osmosis, a pressure is applied to the concentrated side to force water through the membrane, opposite to normal osmostic flow, to further concentrate the material. In ultrafiltration, on the other hand, pressure is applied to a solution to force a permeate through a semipermeable membrane. If, for example, the openings of membrane are sized to pass all portions of the whey except the proteins, the proteins will become concentrated and a permeate (which contains water, lactose, ash, salts and other materials) will pass through the membrane.

One highly successful method for recovering nutrients from cheese whey is described in my U.S. Pat. No. 4,001,198 issued Jan. 4, 1977 for "Method of Recovering Nutrients from Cheese Whey and Purifying the Effluent." The method described therein produces dry food quality protein and lactose powders from cheese whey by sequential ultrafiltration processes, each of which removes as permeate substantial amounts of water and dissolved solids from the respective concentrates. Cheese whey from the cheese plant is first passed through a separator and then strained, cooled and delivered to a holding tank. The whey is then passed through spiral wound ultrafiltration modules to separate a protein rich concentrate and a permeate which contains the lactose and other materials. The protein concentrate is pasteurized, cooled and then evaporated and spray dried to form one final product from the method. The permeate is treated further by passing it through a second ultrafiltration unit, this one having a membrane selected for the rejection of lactose. A lactose rich concentrate is formed and a second permeate is produced. In the process of the above-mentioned patent, the concentrate is washed and further concentrated and the lactose crystals are prepared by subsequent vacuum evaporation and drying steps. The permeate from the lactose concentration is subsequently treated in my process by a third ultrafiltration step to remove fine solids and the permeate resulting from that step is treated with oxygen to lower the BOD of the final effluent.

While the process just described is highly beneficial, problems have been encountered with handling of the lactose containing permeate, especially in the evaporation of same. Similar problems also exist where other methods of removing protein (i.e. other than ultrafiltration) have been employed to produce deproteinized whey.

The basic problem is that the permeate is difficult to evaporate because of precipitation of calcium containing products (primarily phosphates) on the heat exchange surfaces of the evaporators. The precipitation results in decreased heat exchange efficiency and leads to greater evaporating costs. The precipitate is also difficult to remove, leading to increased down time and cleaning chemical costs. Moreover, it has been discovered by the present inventor that certain components in the deproteinized whey have valuable uses and that recovery of same could result in economic benefits as well as the elimination of handling problems.

One example of the foregoing is that it is desirable to manufacture a dicalcium phosphate, lactose, protein mixture as an aid in controlling melt and as an extender in the manufacture of cheese products. This is typically accomplished by dry blending the various ingredients. Recovery of the dicalcium phosphate as part of the process for preparing the lactose and protein would be beneficial and would also eliminate the fouling characteristics inherent in evaporation of the permeate. Another use for deproteinized whey is as a hydralized syrup. In this known process, deproteinized whey is cooled to 85° F., innoculated with lactose enzyme and incubated for a selected period. The material is then passed through an ultrafiltration module to prepare a concentrate which has a volume of about 2% of the original volume, the concentrate being used to reinnoculate another batch. However, with this process, fouling of the ultrafiltration membrane with calcium containing materials occurs and the process could be improved by removal of same. A technique for improving the handling characteristics of deproteinized whey in these and other processes for using deproteinized whey would be a significant advance in the art.

OBJECTS AND SUMMARY OF THE INVENTION

It is a primary object of the present invention to provide a method for removing dicalcium phosphate from deproteinized cheese whey.

Another object of the present invention is to provide a method for improving the handling characteristics of deproteinized cheese whey when it is evaporated or used to form a hydrolized syrup.

A further object of the present invention is to provide a method for reducing fouling of evaporators used to concentrate deproteinized whey or membranes used for the concentration of same.

How these and other objects of the present invention are accomplished will be described in the following specification. Generally, however, the objects are accomplished in a method which includes adjusting the pH and subsequently heating deproteinized whey. Calcium hydroxide is then added to remove most phosphates from the deproteinized whey as dicalcium phosphate. A holding period for complete precipitation is followed by removal of the precipitate by any suitable clarifier means. The treated deproteinized whey may then be evaporated or used to prepare a hydrolyzed syrup. The recovered precipitate may be used in the aforementioned extender for cheese products.

DESCRIPTION OF THE PREFERRED EMBODIMENT

The starting material for use in the process of the present invention is deproteinized cheese whey. The most preferred method for its preparation is that described in my earlier mentioned U.S. Pat. No. 4,001,198, the disclosure of which is expressly incorporated herein by this reference. The apparatus described in that patent is also especially favored for preparing the deproteinized whey. However, it should be pointed out at the beginning of this description that the method of the present invention may be practiced on deproteinized whey made by other processes and using apparatus other than the ultrafiltration apparatus described in my patent.

The first step in the process is to adjust the pH of the deproteinized whey by the introduction of potassium hydroxide to a level of between 6.4–7.0, the preferred range being between 6.5–6.7.

Following the pH adjustment, the deproteinized whey is heated to a temperature of not more than 180° F., a range of 150°–180° F. being acceptable, but a range of 160°–180° F. being preferred. The temperature is maintained at that level for about four hours, but the holding time is not critical to the present invention.

The third step is to add calcium hydroxide to the pH adjusted and heated deproteinized whey to precipitate dicalcium phosphate therefrom. The amount of calcium hydroxide should not exceed 1/10 of one percent by weight based on the dry matter solids of the deproteinized whey, and is preferably added in the minimum quantity necessary to precipitate all the phosphates contained in the whey. The calcium hydroxide can be added gradually and the material can be tested periodically to determine the absence of phosphorus.

The next step is to hold the treated whey in a holding tank for at least two hours, four hours being preferred to insure the complete precipitation of the dicalcium phosphate.

Finally, the treated deproteinized whey is passed through a sludge clarifier to remove the precipitate. Other clarifiers known to the dairy art can be employed.

The dicalcium phosphate can be dewatered and used as a powder or can be admixed with other materials, such as protein and lactose containing products for use as extenders or emulsifiers in the cheese making art. The lactose containing material, with the diclacium phosphate removed, may be evaporated as is known to the art up to a level of about 60% solids, and it has been determined that the fouling of the evaporator is substantially reduced.

It is not fully understood how the combination of steps involved in the present invention so dramatically improves the handling characteristics of the deproteinized whey or results in more complete removal of the phosphates, but the method does result in such improvements over the simple precipitation of the phosphates by addition of calcium hydroxide in a single step process.

Further uses of the deproteinized whey, following removal of the dicalcium phosphate, will appear to those skilled in the art after reading the present specification and the invention is not to be limited to any such uses but is to be limited solely by the claims which follow:

I claim:

1. A method for removing phosphates from deproteinized cheese whey comprising the steps of adjusting the pH of the deproteinized whey to between 6.4–7.0, subsequently heating the deproteinized whey to a temperature of at least 150° F. but not more than 180° F., subsequently adding calcium hydroxide to the heated deproteinized whey to precipitate phosphates therefrom, the addition of calcium hydroxide being in an amount sufficient to precipitate substantially all phosphates therefrom but in no event should the concentration exceed about 0.1% by weight based on the solids contained in said deproteinized whey, subsequently holding the thus treated deproteinized whey for a holding period lasting at least two hours to allow the material to cool and permit the further precipitation of dicalcium phosphate and removing the dicalcium phosphate precipitate from the deproteinized whey.

2. The method set forth in claim 1 wherein said pH is adjusted to a level of between 6.5–6.7.

3. The invention set forth in claim 1 wherein said heating step is carried out until the deproteinized whey is heated to a temperature of between 160°–180° F.

4. A method of preparing a deproteinized cheese whey and improving the handling characteristics thereof by removing phosphates therefrom comprising the sequential steps of:
(a) deproteinizing the whey by employing a membrane impervious to the major portion of the protein molecules contained in the whey and employing the process of ultrafiltration and collecting the permeate as deproteinized whey;
(b) adjusting the pH of the permeate to a level of between 6.5–6.7;
(c) heating the deproteinized whey to a temperature of between 160° F. and 180° F.;
(d) adding sufficient calcium hydroxide to the heated deproteinized whey to precipitate substantially all phosphates therefrom as dicalcium phosphate;
(e) holding the material from step (d) for a period of at least two hours to allow the deproteinized whey to cool and to precipitate further dicalcium phosphate therefrom; and,
(f) removing the precipitate from the deproteinized whey.

5. The method of claim 4 comprising the further step of partially evaporating the deproteinized whey.

* * * * *